United States Patent Office 2,885,368
Patented May 5, 1959

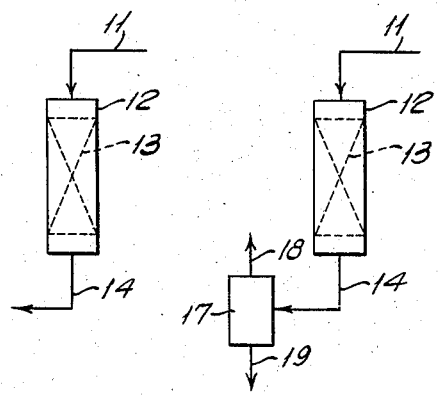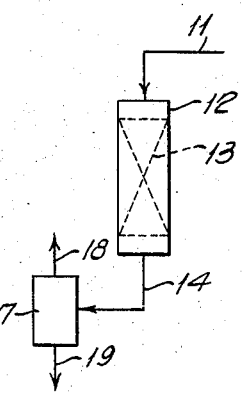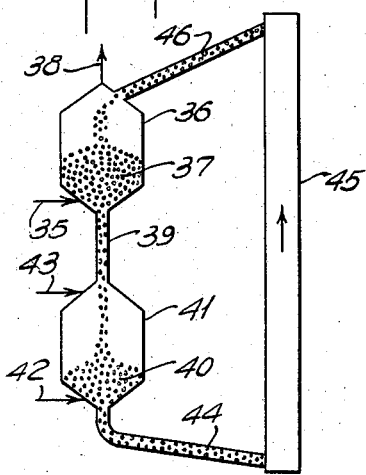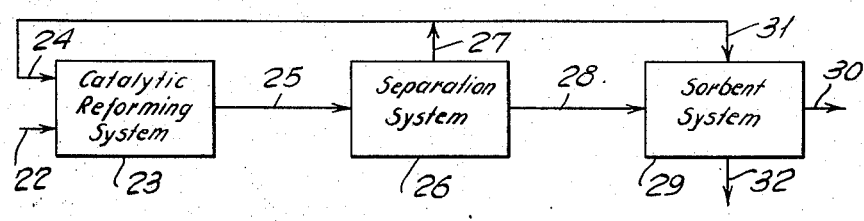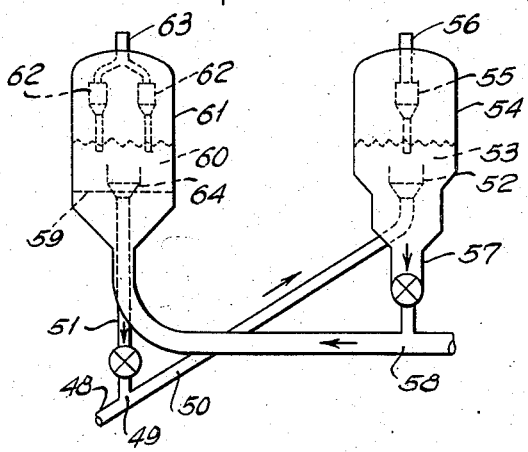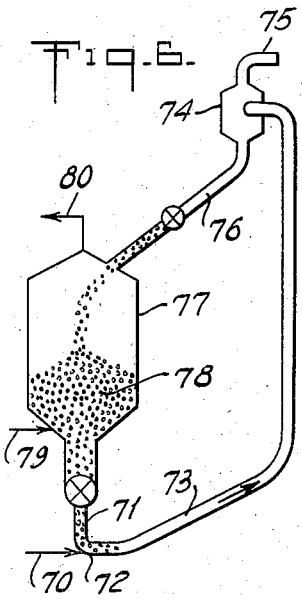

2,885,368

STABILIZED MINERAL SORBENTS AND PROCESS THEREFOR

Howard V. Hess, Glenham, and Watson A. Ray, Rock Tavern, N.Y., assignors to The Texas Company, New York, N.Y., a corporation of Delaware Application November 1, 1955, Serial No. 544,185

22 Claims. (Cl. 252—428)

This invention relates to a durable mineral sorbent selective for straight chain hydrocarbons to the substantial exclusion of non-straight chain hydrocarbons in a mixture thereof, process for making said sorbent, and process for employing said sorbent for treatment of hydrocarbon streams. For convenience herein our process of rendering the mineral sorbent thus durable is called a stabilizing treatment and the product of the treatment is called a stabilized mineral sorbent, i.e., the treated sorbent being one having greater resistance to abrasion and to crushing than a corresponding untreated one. Our treatment is in effect a type of case hardening of a preformed solid mineral sorbent as opposed to either a cementing of fine particles of such mineral sorbent together or coating an agglomerate of such particles with a material which, though protective to the mineral sorbent base, rubs off and wears off easily.

A solid selective sorbent which selectively sorbs straight chain hydrocarbons to the substantial exclusion of non-straight chain hydrocarbons is a suitable base material for the practice of our invention, and herein will be called a "mineral sorbent" for convenience. It is preferred, however, to employ as the selective sorbent certain natural or synthetic zeolites or alumino-silicates, such as a calcium alumino-silicate, which exhibit the property of a molecular sieve, that is, matter made up of porous crystals wherein the pores of the crystals are of molecular dimension and are of substantially uniform size. A particularly suitable mineral sorbent for straight chain hydrocarbons is a calcium alumino-silicate, apparently actually a sodium calcium alumino-silicate, manufactured by Linde Air Products Company and designated in the trade as Linde Type 5A molecular sieve. The crystals of this particular calcium alumino-silicate have a pore size or diameter of about 5 Angstrom units, such pore size being sufficiently large to admit straight chain hydrocarbons. This particular mineral sorbent is available olefins to the substantial exclusion of the non-straight chain naphthenic, aromatic, isoparaffinic and isoolefinic hydrocarbons. The particular mineral sorbent is available in various sizes, e.g., a finely divided powder having a particle size in the range of 0.5-5.0 microns, exhibiting a bulk density in lbs. per cubic foot of 33, and a particle density in grams per cc. of 1.6. Another form of the above-mentioned selective sorbent is a multiplicity of the powder particles agglomerated with a binder, extruded in cylindrical form, and cut into short lengths. Still another form is a multiplicity of the powder particles agglomerated into irregular particles of 14–30 mesh size.

Also amenable to our case-hardening treatment is the mineral sorbent manufactured by Linde Air Products Company and designated in the trade as Linde Type 4A molecular sieve. This material, apparently a sodium alumino-silicate, is made of crystals having a pore size or diameter of about 4 Angstrom units. It is suitable for separating lower straight chain hydrocarbons such as methane, ethane and propane from higher molecular weight hydrocarbons and/or hydrogen by selective sorption of the lower hydrocarbons.

Other suitable solid selective mineral sorbents include the synthetic and natural zeolites, which, when dehydrated, may be described as crystalline zeolites having a rigid three dimensional anionic network and having interstitial dimensions sufficiently large to sorb straight chain hydrocarbons but sufficiently small to exclude non-straight chain hydrocarbons possessing larger molecular dimensions. The naturally occurring zeolite, chabazite, exhibits such properties. Another suitable naturally occurring zeolite is analcite, $NaAlSi_2O_6 \cdot H_2O$, which, when dehydrated, and when all or part of the sodium is replaced by an alkaline earth metal such as calcium by base exchange, yields a material which may be represented by the formula $(Ca,Na_2)Al_2Si_4O_{12} \cdot 2H_2O$, and which, after suitable conditioning, will sorb straight chain hydrocarbons to the substantial exclusion of non-straight chain hydrocarbons. Naturally occurring or synthetically prepared phacolite, gmelinite, harmotome and the like or various base exchange modifications of these zeolites are also suitable.

By straight chain hydrocarbons is meant any aliphatic or acyclic or open chain hydrocarbon which does not possess side chain branching. Representative straight chain hydrocarbons are the normal paraffins and the normal olefins, mono or polyolefins, or straight chain acetylenic hydrocarbons. The non-straight chain hydrocarbons comprise the aromatic and naphthenic hydrocarbons as well as the isoparaffins, isoolefinic hydrocarbons and the like. Straight chain hydrocarbon-containing mixtures which are suitably treated in accordance with this invention include normal alkane-isoalkane mixtures and the various petroleum fractions such as a naphtha fraction, a gasoline fraction, a diesel oil fraction, a kerosene fraction, a gas oil fraction, a lubricating oil fraction, and the like. Particularly suitable for treatment in accordance with this invention are straight chain hydrocarbon-containing fractions having a boiling point or a boiling range in the range of 40–550° F. and containing a substantial amount of straight chain hydrocarbons, e.g., 2–35% by volume. More particularly, a petroleum fraction suitable for use in the practice of this invention could have an initial boiling point in the range of 40–300° F. and an end point in the range of 150–550° F. A petroleum fraction for use in the practice of this invention must contain both straight chain and non-straight chain hydrocarbons as demonstrated by the following composition:

| Hydrocarbon type: | Percent by volume |
|---|---|
| Naphthenes | 0–75 |
| Aromatics | 0–50 |
| Acyclic saturates (including normal paraffins and isoparaffin) | 2–90 |
| Acyclic unsaturates (including normal olefins and isoolefins) | 0–50 |

Typical refinery stocks or fractions which are applicable to the practice of this invention are normal butane-isobutane mixtures, a wide boiling straight run naphtha, a light straight run naphtha, a heavy straight run naphtha, a catalytically cracked naphtha, a thermally cracked or thermally reformed naphtha, a catalytically reformed naphtha and the like. By the term "motor naphtha" used herein we mean a naphtha fraction suitable as a base for conventional automobile fuel and containing no additives, as to be distinguished from gasoline which can contain various additives of specialized function, e.g., tetraethyl lead.

Mineral sorbents, perhaps because of their porous structure, are quite fragile. Pellets of agglomerated mineral sorbent particles tend to reduce to an impalpable powder simply upon being rubbed together or being squeezed in the hand. As the sorptive capacity of the mineral sorbents for straight chain hydrocarbons is only about 5 to 15 percent of the dry weight of the sorbent particles, and as cost of mineral sorbents is quite high, it is important that the sorbent be stabilized for durability so that it can be used over and over again, particularly in moving or fluidized bed systems, thereby enabling a refiner to maintain a relatively low inventory of sorbent per unit weight or volume of hydrocarbons to be treated. Conventional mineral sorbents are either too fine or too fragile to use in moving or fluidized bed systems without entailing much attrition and heavy losses to gas vents.

Our process for stabilizing solid mineral sorbent comprises coating the mineral sorbent with a polyhydrated salt of a metal of groups 1–4 of the periodic table and calcining the coated particles.

Suitable polyhydrated salts for use in the practice of my process are, for example, aluminum nitrate nonahydrate, calcium ammonium phosphate heptahydrate, aluminum fluoride heptahydrate, magnesium sulfate heptahydrate, hydrated calcium borates, alunogenite, trisodium phosphate dodecahydrate, sodium metasilicate nonahydrate, sodium hypophosphate decahydrate, borax (sodium tetraborate·10H$_2$O), magnesium acetate tetrahydrate, magnesium ammonium phosphate hexahydrate, magnesium nitrate hexahydrate, magnesium phosphate octahydrate, calcium lactate pentahydrate, thorium nitrate tetrahydrate, titanium oxalate decahydrate, zirconium nitrate pentahydrate, and zirconium sulfate tetrahydrate. Many other polyhydrated compounds of metals of groups 1–4 are suitable providing they are soluble or readily dispersible in a solvent such as water or aqueous 10% by weight sodium citrate solution. To make the most desirably porous residue after calcination, the polyhydrated compound for the coating should be initially at least tetrahydrated.

The coating of the mineral sorbent is most readily and preferably done by soaking the sorbent in an aqueous solution of the polyhydrated compound, then drying the sorbent. If it is desired, however, the polyhydrated compound can be formed into a wet paste with solvent and the paste applied to the surface of the sorbent. When the coated sorbent is calcined, the water of hydration is driven off and, in some cases, the coating is changed in chemical constitution, e.g., to an oxide.

Calcining is performed at temperatures sufficiently high to drive off virtually all bound water, i.e., water of hydration, of the polyhydrated compound, but not so high as to damage the mineral sorbent base. This operation also "dries" and activates the mineral sorbent. Broadly the calcining temperature is from about 300° to about 1100° F., advantageously between about 600 and 1100° F. and preferably at about 900–1000° F. Short periods of exposure of the coated mineral sorbent to even higher temperature, e.g., 1200–1300° F. for 2–5 minutes, can be tolerated in some cases. Pressure preferred in the calcining operation is atmospheric, but higher or lower pressures can be used, and at lower calcining temperatures use of reduced pressure is desirable. For efficiency and economy in the practice of our invention, calcining is ordinarily done in air, but can be done in the presence of an inert gas such as nitrogen if desired. A sweep of gas through the calcining vessel is useful for conveying vapors off. Calcining time generally is in excess of 3 hours, and 8–24 hours is usually sufficient to drive off all bound water.

While not intending to be bound by any theory as to exactly why the extremely durable sorbent results from our process, we think that some fusion of the calcined residue of the polyhydrated compound with the mineral sorbent base results, and that such fusion is made possible by the presence of metals of groups 1–4 in the polyhydrated compound. Our preferred stabilized sorbents are ones wherein the mineral sorbent base is covered with the calcined residue of borax or a hydrated calcium borate. The borax treatment usually imparts a dark surface to the outside of the mineral sorbent while the calcium borate-treated sorbent remains white. The release of bound water in the polyhydrated compound makes the case hardened surface of the solid sorbent permeable whereby straight chain hydrocarbons can be sorbed on the sorbent base.

We have found that the amount of polyhydrated compound applied to the sorbent in the coating operation should be at least about 1–5% by weight of the dry mineral sorbent to impart sufficient ruggedness to the resulting calcined product. However, if too heavy a coating (generally from application of more than 50% polyhydrated compound by weight of dry mineral sorbent) is used, the hydrocarbon sorbing capacity per unit weight of the resulting calcined product is badly impaired. Preferentially we apply between about 5 and 35 parts by weight of polyhydrated compound per 100 parts by weight of dry mineral sorbent to obtain, after calcining, a sorbent which has both extreme durability and only about 5–30% less sorbing capacity than the original capacity of the untreated mineral sorbent base.

The group 1–4 metal moiety of many of the useful polyhydrated compounds can undergo base exchange with materials making up a fraction of the mineral sorbent and thereby change its structure, losing operability or capacity for a particular separating operation, e.g., some calcium in the 5A molecular sieve can be replaced by sodium from a borax treatment or some sodium in the Linde 4A molecular sieve can be replaced by calcium from a hydrated calcium borate. By proper choice of polyhydrated compound, e.g., use of a polyhydrated calcium salt for treating the 5A material, this risk, of course, can be avoided.

We have also found in our production of stabilized sorbents that a first step treatment of the mineral sorbent base with a protective impregnant such as a hydrogenated fat, stearic acid or other high molecular weight fatty acid of 10–30 carbon atoms, starch, wheat flour, aluminum stearate, calcium stearate, a lower alkanol of 1–20 carbon atoms, esters thereof with fatty acids, and/or a lower alkane of 5–10 carbon atoms eliminates risk of such base exchange for all practical purposes. The protective impregnant, which can also be used in some cases as a pilling or pelleting lubricant, can be applied conveniently when pelleting the fine mineral sieve particles or otherwise agglomerating them preparatory to coating the mineral sorbent with the polyhydrated compound. Alternatively the sorbent particles can be soaked or otherwise coated with such impregnant. About 2–40%, preferably about 5–15%, of such protective impregnant based on the weight of the mineral sorbent is used. As much as 50% renders the pellet too frangible after calcining as the protective material is expelled or burned off in subsequent treatment. By such protective treatment it is believed that the pores of the base mineral sorbent will be at least partially blocked and therefore protected from base exchange with the wet polyhydrated compound to be applied thereafter. When a lower alkane is used as the protective material, it can be expelled after the coating procedure, e.g., to make the coated sorbent safe from fire or explosion in the calcining step to follow. The less volatile protective materials, e.g., hydrogenated fat, stearic acid, starch, or aluminum stearate, need not be removed before calcining, but will be partially or entirely burned out or volatilized in the calcining step. After calcining the finished sorbent is receptive to straight chain hydrocarbons.

In another embodiment of our invention we have found that sorbent particles suitable for fluidizing can be made by forming a dense agglomerate of fine mineral sorbent particles which are otherwise too fine for fluidized operation, comminuting said agglomerate into pieces of fluidizing size, coating the comminuted particles with the polyhydrated compound, and calcining the coated particles. Advantageously the dense agglomerate is formed by pelleting the fine particles in a confining die using a combustible lubricating binder such as hydrogenated fat, starch and/or stearic acid. Alternatively, a paste of fine particles with water or a hydrous amphoteric oxide gel or the like can be made and extruded, then cut into pellet size and dried prior to the comminuting step.

The case hardened sorbent of our invention can be made into practically any size or shape. For fixed bed operation cylindrical pellets or beads 1/16" to about 5/8" size are the most practical. Spheres or beads in this size range appear the most suitable for a moving bed operation where the sorbent particles are in motion but not in a fluidized state. For use in a fluidized bed stabilized sorbent of the screen range 100-300 mesh (U.S. Standard) is preferred.

Broadly the method of treating a hydrocarbon stream with our stabilized sorbent comprises contacting said stream with the sorbent, thereby producing a treating effluent having reduced amounts of straight chain hydrocarbons and a stabilized sorbent containing sorbed straight chain hydrocarbons; separating treated effluent from the laden sorbent; and recovering sorbed hydrocarbons from the laden sorbent by subjecting it to contact with a gaseous desorbing medium.

The presently most appealing application of our polyfunctional sorbent is in the upgrading of motor naphtha stock (increasing octane rating of various components of the stock or the whole stock). Advantageously, the stabilized sorbent is used as an adjunct to a catalytic reforming system. Treating of hydrocarbon stocks with the sorbent can be done with the hydrocarbon feed in liquid or in gas phase or partially in liquid phase and partially in gas phase during part or all of the treating operation. Vapor phase operation is preferred. During the sorbing operation temperature generally will be maintained between about 50-750° F. and preferably is about 100-400° F. Pressure can range from atmospheric or below to 1000 p.s.i.g. or even higher.

Desorbing temperature is selected in the range of about 100° to about 1000° F. Above about 1100° F. the base mineral sorbent structure can be adversely affected. Desorbing can be conducted in a manner of ways, e.g., at about the same temperature as the sorbing but at lower pressure. Alternately the pressure may remain essentially the same in the desorbing step as in the sorbing step and a higher temperature can be used in the desorbing. In the desorbing step the use of a temperature higher and pressure lower than those used in the sorbing step assists desorbing. The desorbing medium, e.g., nitrogen, hydrogen, carbon dioxide, flue gas, methane, natural gas preponderantly composed of methane, lower hydrocarbons up to $C_4$ hydrocarbons or mixtures of such desorbing media, strips out and conveys desorbed hydrocarbons from the sorbent, thereby regenerating it for another sorbing cycle. A preferred desorbing medium for use in the practice of our invention is a gas having atomic number below 8, i.e., hydrogen, helium or nitrogen, since carbon deposition of the sorbent is minimized if not practically entirely prevented by use of such gaseous desorbent. For efficiency and economy one of the most highly preferred desorbing mediums is hydrogen, i.e., substantially pure hydrogen or hydrogen obtained from a conventional naphtha reforming operation such as a "Platforming" operation (the trade name of the Universal Products Company for naphtha reforming using a platinum-alumina catalyst). Such hydrogen streams can contain up to about 25 volume percent of light hydrocarbons such as methane and ethane without substantially affecting the efficiency of the invention process.

In either the desorbing or the sorbing operation use of temperature substantially above that at which the particular stabilized sorbent was calcined preferably is avoided to eliminate any risk of fusion and impairment of the stabilizing coating.

Treatment of hydrocarbons with our stabilized sorbent can be better understood with reference to the accompanying drawings. Figures 1 and 2 show the use of a simple fixed bed system of the stabilized sorbent as can be used to evaluate the effectiveness of a particular sorbent batch. In Figure 1 a raw vapor mixture of straight chain and non-straight chain hydrocarbons, e.g., naphtha or a mixture of normal butane and isobutane, is passed through inlet 11 of vessel 12, downward in vapor phase through the fresh sorbent bed 13, and out outlet 14, thereby emerging as a treated vapor product having reduced amounts of straight chain hydrocarbons in comparison to non-straight chain hydrocarbons. Pressure in vessel 12 can be from about atmospheric or below up to about 1000 p.s.i.g. and temperature between about 50° and 750° F. Advantageously flow of the hydrocarbon volume therethrough is maintained between about 0.2 and about 3.0 volumes (measured as liquid) per volume of stabilized sorbent per hour and preferably between about 0.5 and about 1.5 volumes per volume per hour.

When the sorptive capacity of bed 13 is substantially depleted by the passage of the raw hydrocarbon (as can be noted, in the case of naphtha feed, by refractive index or the A.P.I. gravity of the treated product emerging from outlet 14 approaching the feed value for these constants), the desorbing operation is conducted as shown in Figure 2. Here, flowing at 25 to 200 gas volumes per hour per volume of stabilized sorbent, a gasiform desorbing medium, e.g., nitrogen or hydrogen or a condensible medium like isobutane, is passed through inlet 11 into vessel 12 wherein temperature is maintained about the same or above that of the sorbing operation, preferably at lower pressure and at higher temperature than the sorbing operation to enhance stripping effect of the desorbing medium. The desorbing medium passes downwardly through bed 13 and out outlet 14 bearing with it desorbed straight chain hydrocarbons originally sorbed from the raw hydrocarbon feed. The laden desorbing medium is then separated in separator 17 into denuded desorbing medium which is withdrawn through outlet 18 and recovered straight chain hydrocarbons which are withdrawn through outlet 19. Separation is conveniently accomplished by condensing the recovered hydrocarbons, e.g., by cooling and/or compressing the laden desorbing stream, or by adsorbing the hydrocarbons on activated charcoal from which they can be stripped, or by a combination of such techniques. A similar sorbing and desorbing operation can be conducted in practically any direction through the bed of sorbent, and this invention is not restricted to a particular flow direction through any bed or mass of our sorbent.

Figure 3 shows one way of upgrading a naphtha fraction employing our stabilized sorbent in combination with a conventional reforming operation, e.g., Platforming, Hyperforming or Thermofor catalytic reforming. Raw naphtha vapor to be upgraded is fed through inlet 22 into conventional reforming system 23 along with a recycle flow of hydrogen entering inlet 24. One or more fixed bed reactors or moving bed reactors or fluidized bed reactors can be used in the reforming system. Temperature in such reforming system is generally between about 600° and 1000° F., rising in a series of reactors ordinarily from about 875° to 975° F. Pressure in the reforming system is maintained broadly between 50 and 1000 p.s.i.g. generally between about 500 and 800 p.s.i.g. Hourly liquid space velocity of the naphtha feed is between about 0.5 and 10 volumes of nahptha per volume of catalyst per hour and the hydrogen:naphtha mol ratio is maintained between about 0.5:1 and 10:1 in the reforming vessel. The catalyst used can be, for example, a conventional platinum-containing catalyst, a conventional cobalt molybdate catalyst, a conventional chromia-alumina catalyst, or a conventional molybdena-alumina catalyst. Motor naphtha of enhanced octane rating and hydrogen are withdrawn from the reforming system by line 25 and passed to separation system 26. Herein hydrogen is separated and withdrawn through outlet 27 while motor naphtha is withdrawn from outlet 28 and fed into sorbent system 29. The sorbent system of our invention is one or more vessels arranged for fixed bed, moving bed, or fluidized bed contact of the motor naphtha in vapor or liquid phase with the stabilized sorbent of our invention. The motor naphtha is preferably contacted in vapor phase with the solid sorbent.

During the sorbing operation temperature of the sorbent beds or beds on sorbing service is maintained between about 50° and 750° F. and pressure is maintained between 0 and 1000 p.s.i.g. A stream of treated naphtha having a reduced amount of straight chain hydrocarbons is withdrawn from sorbent system 29 by outlet 30 and condensed. Periodically one or more vessels in the sorbent system are stripped of sorbed hydrocarbons by a portion of the hydrogen from the separation system, said hydrogen being withdrawn from outlet 27 and passed into the sorbent system through inlet 31 as a desorbing medium. Hydrogen from outlet 27 is also recycled to the conventional catalytic reforming system in inlet 24. During desorption the sorbent beds are maintained between 100 and 1000° F. and about atmospheric to 1000 p.s.i.g. pressure whereby the hydrogen flow entering line 31 strips the bed or beds of sorbed hydrocarbons and is withdrawn laden with these hydrocarbons through outlet 32. Advantageously the hydrogen is preheated for desorbing to temperature of about 600–1000° F. The laden desorbing medium issuing from outlet 32 is separated into recovered straight chain hydrocarbons and hydrogen for re-use.

Figure 4 shows a moving bed operation employing our stabilized sorbent. Sorption and desorption pressure and temperatures are maintained as described as hereinbefore. In such system our rugged sorbent resists the attrition attendant to the operation. A hydrocarbon vapor stream containing straight chain and non-straight chain hydrocarbons is passed through inlet 35 into vessel 36 containing a bed of fresh sorbent 37. Herein straight chain hydrocarbons are sorbed on the fresh bed and treated hydrocarbon effluent vapor having a reduced amount of straight chain hydrocarbon is withdrawn from outlet 38. Bed 37 is being constantly replenished by a supply of desorbed stabilized sorbent particles entering from inlet 46, and is maintained at substantially constant volume by withdrawal of sorbent laden with straight chain hydrocarbons down outlet 39, through a star feeder or similar mechanism whereby the laden sorbent is passed into the top of laden bed 40 maintained in vessel 41. Gaseous desorbing medium, e.g., hydrogen, is passed into the base of vessel 41 through inlet 42 and withdrawn near the top of vessel 41 through outlet 43. The stream of desorbing medium strips stripped straight chain hydrocarbons from the laden sorbent and conveys them away for recovery. Bed 40 is maintained at substantially constant volume by withdrawing desorbed stabilized sorbent down outlet 44, through a star feeder or similar mechanism, and into elevator means 45. Vessels 36 and 41 are sized to give sufficient residence time for economical sorption of straight chain hydrocarbons on the stabilized sorbent and desorption of these hydrocarbons therefrom. Elevator means 45, which can be a gas lift, a screw, or a bucket elevator, passes the desorbed sorbent up to inlet 46 which feed vessel 36. Makeup stabilized sorbent can be added to the system at any convenient point, e.g., outlet 44, elevator 45, inlet 46 or vessel 36. Where pressure changes between sorption and desorption vessels is large it is often advantageous to use one or more lock hoppers to transfer the sorbent between the vessels.

Figure 5 shows one way in which our stabilized sorbent can be utilized in a fluidized operation wherein the stabilized sorbent particles are from about 100 to 300 mesh size. Liquid naphtha (which can be superheated) containing both straight chain and non-straight chain hydrocarbons is injected into inlet 48, and at junction 50 the naphtha is vaporized by contacting hot desorbed stabilized sorbent particles being fed from downpipe 51. The vaporized naphtha entrains these particles and passes up pipe 50 through distributor 52. The flow in pipe 50 can be passed through a heat exchange means not shown to control temperature. This flow of vapor-containing sorbent maintains bed 53 in fluidized state in sorber 54. Item 55 denotes a cyclone separating system, which can be one or more cyclone separators maintained in series and/or parallel, whereby naphtha containing a reduced amount of straight chain hydrocarbons is passed out of outlet 56 and entrained sorbent particles are dropped back to fluidized bed 53. Fluidized bed 53 is maintained at substantially constant volume by continuous withdrawal of sorbent particles in downpipe 57. Methane at temperature of about 1000° F. or higher is injected in pipe 58 wherein it entrains the sorbent particles being passed from downpipe 57. The flow in pipe 58 can be passed through heat exchange means not shown to control temperature. The methane-sorbent particle mixture is passed through grid 59 and maintains stabilized sorbent bed 60 in fluidized condition. Item 62 is a cyclone separating system and outlet 63 the point of withdrawal for methane laden with desorbed straight chain hydrocarbons. Treated sorbent particles entrained in the desorbing medium stream are returned to the bed from cyclone separator 62. Fluidized bed 60 is maintained at substantially constant volume by continuous withdrawal of some sorbent particles from outlet 64. The withdrawn hot particles are passed down standpipe 51 for feed into the raw naphtha stream entering inlet 48. Temperature and pressure in the sorber and the desorber are maintained within the ranges hereinbefore described. Advantageously the pressure differential between vessels 54 and 61 is small (15 p.s.i. or less) in this type of operation.

Figure 6 shows another way in which our stabilized sorbent can be utilized in a fluidized operation wherein the stabilized particles are from about 100 to about 300 mesh size. Superheated liquid naphtha containing both straight chain and non-straight chain hydrocarbons is injected into inlet 70, and at junction 72 is vaporized by release of pressure and by contacting hot desorbed stabilized sorbent particles being fed from downpipe 71. The vaporized naphtha entrains these particles and passes up pipe 73, wherein sorption of straight chain hydrocarbons from the vaporized naphtha takes place. The naphtha stream is separated from the laden sorbent particles in cyclone separator 74 and issues from outlet 75 containing a reduced amount of straight chain hydrocarbons. The sorbent particles laden with straight chain hydrocarbons are passed through downpipe 76, through a star feeder and dropped into the top of bed 78 in desorber 77. A flow of methane gas, preheated to about 1100° F., is passed into the base of desorber 77 through inlet 79 and passes at low velocity through bed 78, the velocity of the desorbing medium being insufficient to fluidize bed 78. Desorbing medium laden with desorbed straight chain hydrocarbons is withdrawn from vessel 77 at outlet 80. Bed 78 is maintained at substantially constant volume by continuous withdrawal of sorbent particles through downpipe 71.

The following examples show several ways in which our invention has been practiced but are not to be construed as limiting the invention. Herein gas flows are referred to standard conditions of temperature and total pressure, i.e., 60° F. and 760 mm. Hg. Except as otherwise indicated percentages are weight percentages.

*Example 1.*—One-hundred grams of dried Linde 5A molecular sieve of size grading between about 2 and 4 microns was mixed with 10% of its weight of hydrogenated fat and formed into 5/32" diameter x 3/32" high cylindrical pellets in a confining die. These pellets were broken into particles into 18–60 mesh size. The particles were soaked in n-heptane, drained, and the heptane-saturated particles then mixed with a solution of 30 grams of borax ($Na_2B_4O_7 \cdot 10H_2O$) in 60 ml. of water. The particles, impregnated with borax solution amounting to about 30% borax based on the dried mineral sorbent used, were air-dried until damp, then calcined at 900° F. for 8 hours. The resulting solid particles, black and extremely hard, were formed into a sorbing bed and n-butane was passed therethrough at room temperature and pressure. The sorbing capacity of these particles was 26 ml. of n-butane vapor per gram of particles, which is about 75% of the sorbing capacity of untreated Linde 5A molecular sieve powder for n-butane vapor under the same conditions.

*Example 2.*—Two one-hundred gram batches of Linde 5A molecular sieve pellets made in the same way as those described in Example 1 were soaked in n-heptane and these impregnated with borax solutions. The first batch, called batch A, was mixed with a solution of 20 grams of borax in 60 ml. of water, and 20 ml. of excess solution was decanted. The second batch, called batch B, was mixed with a solution of 30 grams of borax in 60 ml. of water, and 20 ml. of excess of solution was decanted. The batches, impregnated respectively with about 13.3% and 20% borax based on the weight of the dry mineral sorbent used, were calcined for 18 hours to produce hard black stabilized pellets.

A number of individual pellets were taken at random from each batch and crushed in testing apparatus. Seven tenths of the batch A pellets tested had crushing strength above 19 pounds load, and the lowest test for any of them was 9.4 pounds. Seven tenths of the batch B pellets tested had crushing strength above 20 pounds, and the lowest test for any of them was 12.7 pounds. Typical average crushing strength of pellets of the 5A material made in the same way as these pellets, but untreated with polyhydrated compound in the manner of this invention, is about 4.93 pounds and ranges between a maximum of 5.97 and a minimum of 3.12 pounds.

*Example 3.*—Polyhydrated compounds of various metals in groups 1–4 were coated on separate portions of comparatively soft Linde 5A 1/16" diameter x about 1/8" long pellets. The preparations were as follows: 30 grams of the polyhydrated compound dissolved in 35 ml. of water was mixed with 100 grams of the pellets which had been previously soaked in n-heptane and dried superficially before the coating operation. Each batch of coated pellets was dried on a steam plate until damp, then calcined at 900° F. for 4–8 hours. Table I, below, shows the n-butane sorbing activity in ml. of n-butane vapor per gram of finished sorbent at room temperature and pressure, average crushing strength per pellet in pounds and abrasion resistance indication of the resulting stabilized sorbent pellets. Abrasion resistance was measured by tumbling the particular variety of stabilized sorbent pellets for two hours in a drum rotating at 17 r.p.m. and equipped with internal flights; after tumbling the drum contents were sieved for 15 minutes on a mechanical sieve equipped with a 16 and a 60 mesh screen.

ml./gm. at room temperature and pressure and crushing strength per pellet thereof averaged 6 pounds.

*Example 4.*—A batch of calcined pellets of Linde 5A molecular sieve, 5/32" diameter x 5/32" long, were coated with an aqueous solution of a highly hydrated calcium borate to obtain about an 8% deposit of the calcium borate based on the weight of base mineral sorbent used. The coated pellets were calcined at 900° F. for 4 hours and incidentally heated to red heat (approximately 1200–1300° F.) for several minutes. The resulting particles were extremely hard and highly active for the sorption of straight chain hydrocarbons, having sorbing capacity for n-butane vapor at room temperature and pressure of roughly 35 ml. per gram of particles.

*Example 5.*—One batch of 5/32" x 5/32" borax-treated Linde 5A molecular sieve pellets was made in essentially the same way as batch A, described in Example 2. A second batch of borax-treated pellets was made using 10% hydrogenated fat without the soaking in a normal alkane preparatory to coating. Crushing strength of both sets of these borax-treated pellets was above 20 pounds per pellet and n-butane sorption was practically identical. This shows the protective effect of the pelleting lubricant against base exchange of the coating material with the base mineral sorbent. In a similar preparation, except that no protective impregnant was present when the coating was applied, the average crushing strength of the pellets was slightly impaired and the sorption capacity for n-butane was almost completely destroyed.

We claim:

1. A process for stabilizing alumino-silicate zeolite particles having exchangeable cation content and substantially uniform sized pores of molecular dimension, said zeolite being selective for sorption of straight chain hydrocarbons to the substantial exclusion of non-straight chain hydrocarbons in a mixture thereof, which comprises: mixing said zeolite particles with a protective medium obstructive to base exchange, said protective medium being selected from the group consisting of a hydrogenated fat, a fatty acid of 10–30 carbon atoms, starch, wheat flour, aluminum stearate, calcium stearate, an alkanol of 1–20 carbon atoms, an ester of an alkanol of 1–20 carbon atoms with a fatty acid, a lower alkane of 5–10 carbon atoms, and mixtures thereof, coating the resulting impregnated zeolite particles with a polyhydrated compound of a metal selected from the group consisting of sodium, magnesium, calcium, aluminum, thorium, titanium, and zirconium, and calcining the coated particles.

2. The process of claim 1 wherein said polyhydrated compound is at least tetrahydrated.

3. The process of claim 1 wherein the quantity of polyhydrated compound used for coating is between about 1 and about 50 parts by weight of the alumino-silicate.

4. The process of claim 3 wherein the alumino-silicate used is a sodium calcium alumino-silicate having effective pore diameter of about 5 Angstrom units.

5. The process of claim 3 wherein the compound used is a borate.

6. A process for stabilizing alumino-silicate zeolite particles having exchangeable cation content and substantially uniform sized pores of molecular dimension, said zeolite being selective for sorption of straight chain hy-

*Table I*

| Coating | $Na_3PO_4 \cdot 12H_2O$ | $Ng(NO_3)_2 \cdot 6H_2O$ | $Al(NO_3)_3 \cdot 9H_2O$ | $Th(NO_3)_4 \cdot 4H_2O$ |
|---|---|---|---|---|
| Test: | | | | |
| n-butane sorption ml./gm. | 18.8 | 35 | 31.3 | 30.4 |
| average crushing strength, lbs. | 17 | 14.5 | 11 | 12 |
| abrasion resistance, approx. percentage retained on 16 mesh. | practically all | 90 | 81.6 | 87.5 |
| between 16 and 60 mesh | trace | 8 | 8.2 | 2.1 |
| passing 60 mesh | trace | about 2 | 10.2 | 10.4 |

N-butane vapor sorbing capacity of the base mineral sorbent used in the above preparations was about 36.5 drocarbons to the substantial exclusion of non-straight chain hydrocarbons in a mixture thereof, which comprises: coating said zeolite particles with a polyhydrated compound of a metal selected from the group consisting of sodium, magnesium, calcium, aluminum, thorium, titanium, and zirconium, said polyhydrated compound being incapable of substantial base exchange with the cation content of said zeolite particles, and calcining the coated particles.

7. The process of claim 6 wherein said polyhydrated compound is at least tetrahydrated.

8. A process for producing attrition-resistant alumino-silicate zeolite particles suitable for fluidized operation, said zeolite having exchangeable cation content and substantially uniform sized pores of molecular dimension, said zeolite being selective for sorption of straight chain hydrocarbons to the substantial exclusion of non-straight chain hydrocarbons in a mixture thereof, which comprises: forming a dense agglomerate of fine particles of said zeolite, comminuting said agglomerate into pieces of fluidizing size, mixing said pieces with a protective medium obstructive to base exchange, said protective medium being selected from the group consisting of a hydrogenated fat, a fatty acid of 10–30 carbon atoms, starch, wheat flour, aluminum stearate, calcium stearate, an alkanol of 1–20 carbon atoms, an ester of an alkanol of 1–20 carbon atoms with a fatty acid, a lower alkane of 5–10 carbon atoms, and mixtures thereof, coating the resulting impregnated pieces with a polyhydrated compound of a metal selected from the group consisting of sodium, magnesium, calcium, aluminum, thorium, titanium, and zirconium, and calcining the coated pieces.

9. A process for producing attrition-resistant alumino-silicate zeolite particles suitable for fluidized operation, said zeolite having exchangeable cation content and substantially uniform sized pores of molecular dimension, said zeolite being selective for sorption of straight chain hydrocarbons to the substantial exclusion of non-straight chain hydrocarbons in a mixture thereof which comprises: forming a dense agglomerate of fine particles of said zeolite, comminuting said agglomerate into pieces of fluidizing size, coating said pieces with a polyhydrated compound of a metal selected from the group consisting of sodium, magnesium, calcium, aluminum, thorium, titanium, and zirconium, said polyhydrated compound being incapable of substantial base exchange with the cations of said alumino-silicate zeolite particles, and calcining the coated particles.

10. A stabilized solid mineral sorbent comprising a dense agglomerate of fine alumino-silicate zeolite particles coated with the calcined residue of 1–50 parts by weight of a polyhydrated compound of a metal selected from the group consisting of sodium, magnesium, calcium, aluminum, thorium, titanium, and zirconium, per 100 parts of zeolite, said stabilized mineral sorbent being selective for sorption of straight chain hydrocarbons to the substantial exclusion of non-straight chain hydrocarbons in a mixture thereof and being a product of mixing said agglomerate with a protective medium obstructive to base exchange, said protective medium being selected from the group consisting of a hydrogenated fat, a fatty acid of 10–30 carbon atoms, starch, wheat flour, aluminum stearate, calcium stearate, an alkanol of 1–20 carbon atoms, an ester of an alkanol of 1–20 carbon atoms with a fatty acid, a lower alkane of 5–10 carbon atoms, and mixtures thereof, coating the resulting impregnated agglomerate with said polyhydrated compound, and calcining the coated agglomerate.

11. The stabilized sorbent of claim 10 wherein the fine alumino-silicate particles are a sodium calcium alumino silicate having effective pore diameter of about 5 Angstrom units.

12. The stabilized sorbent of claim 10 wherein said metal is zirconium.

13. The stabilized sorbent of claim 11 wherein the calcined residue is the residue of a borate.

14. The stabilized solid mineral sorbent of claim 10 wherein said polyhydrated compound is an at least tetrahydrated compound.

15. The stabilized sorbent of claim 14 wherein said metal is sodium.

16. The stabilized sorbent of claim 14 wherein said metal is magnesium.

17. The stabilized sorbent of claim 14 wherein said metal is calcium.

18. The stabilized sorbent of claim 14 wherein said metal is aluminum.

19. The stabilized sorbent of claim 14 wherein said metal is thorium.

20. The stabilized sorbent of claim 14 wherein said metal is titanium.

21. A stabilized solid mineral sorbent comprising a dense agglomerate of fine alumino-silicate zeolite particles coated with the calcined residue of 1–50 parts by weight of a polyhydrated compound of a metal selected from the group consisting of sodium, magnesium, calcium, aluminum, thorium, titanium, and zirconium per 100 parts of said zeolite, said stabilized mineral sorbent being selective for sorption of straight chain hydrocarbons to the substantial exclusion of non-straight chain hydrocarbons in a mixture thereof and being a product of coating said agglomerate with said polyhydrated compound, said polyhydrated compound being incapable of substantial base exchange with the exchangeable cation content of said agglomerate, and calcining the coated agglomerate.

22. The stabilized sorbent of claim 21 wherein said polyhydrated compound is at least tetrahydrated.

References Cited in the file of this patent

UNITED STATES PATENTS

| 620,894 | Dickson | Mar. 14, 1899 |
| 1,766,814 | Fisher | June 24, 1930 |
| 1,813,916 | Cummins | July 14, 1931 |
| 2,375,756 | Bates | May 15, 1945 |
| 2,392,588 | Greensfelder et al. | Jan. 8, 1946 |
| 2,423,612 | Mulligan et al. | July 8, 1947 |
| 2,522,426 | Black | Sept. 12, 1950 |
| 2,591,149 | Grove | Apr. 1, 1952 |
| 2,631,983 | Milliken | Mar. 17, 1953 |

FOREIGN PATENTS

| 148,111 | Great Britain | Oct. 10, 1921 |

UNITED STATES PATENT OFFICE
CERTIFICATE OF CORRECTION

Patent No. 2,885,368　　　　　　　　　　　　　　　　　　　　　　　May 5, 1959

Howard V. Hess et al.

It is hereby certified that error appears in the printed specification of the above numbered patent requiring correction and that the said Letters Patent should read as corrected below.

Column 1, line 51, strike out "hydrocarbons. This particular mineral sorbent is avail-" and insert instead -- hydrocarbons such as the normal paraffins and normal --; line 54, for "The" read -- This --; columns 9 and 10, Table I, third column thereof, in the heading, for "Ng(NO$_3$)$_2$·6H$_2$O" read -- Mg(NO$_3$)$_2$·6H$_2$O --.

Signed and sealed this 25th day of August 1959.

(SEAL)
Attest:

KARL H. AXLINE
Attesting Officer

ROBERT C. WATSON
Commissioner of Patents